United States Patent [19]

Gerwig et al.

[11] Patent Number: 5,999,960
[45] Date of Patent: *Dec. 7, 1999

[54] BLOCK-NORMALIZATION IN MULTIPLY-ADD FLOATING POINT SEQUENCE WITHOUT WAIT CYCLES

[75] Inventors: Gunter Gerwig, Simmozheim; Michael Kröner, Schönaich, both of Germany

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/765,420
[22] PCT Filed: Apr. 18, 1995
[86] PCT No.: PCT/EP95/01459
§ 371 Date: Dec. 16, 1996
§ 102(e) Date: Dec. 16, 1996
[87] PCT Pub. No.: WO96/33457
PCT Pub. Date: Oct. 24, 1996

[51] Int. Cl.[6] .................................................. G06F 7/38
[52] U.S. Cl. .......................... 708/500; 708/500; 708/578
[58] Field of Search ......................... 364/748.01, 748.09, 364/748.1, 748.11, 748.14, 754.01, 761, 768, 760.04, 736.02, 703, 722, 724.03, 726.04, 736.01, 736.04, 736.05, 740, 715.04

[56] References Cited

U.S. PATENT DOCUMENTS

| | | | |
|---|---|---|---|
| 4,562,553 | 12/1985 | Colley et al. | 395/412 |
| 4,758,974 | 7/1988 | Fields et al. | 364/748 |
| 4,926,369 | 5/1990 | Hokenek et al. | 364/715.04 |
| 5,053,631 | 10/1991 | Perlman et al. | 364/748 |
| 5,058,048 | 10/1991 | Gupta et al. | 364/748 |
| 5,126,963 | 6/1992 | Fukasawa | 364/748 |
| 5,204,825 | 4/1993 | Ng | 364/715.04 |
| 5,267,186 | 11/1993 | Gupta et al. | 364/748 |
| 5,317,527 | 5/1994 | Britton et al. | 364/715.04 |
| 5,408,426 | 4/1995 | Takewa et al. | 364/748 |
| 5,424,968 | 6/1995 | Okamoto | 364/715.04 |
| 5,493,520 | 2/1996 | Schmookleo et al. | 364/715.04 |
| 5,633,819 | 5/1997 | Brashears et al. | 364/748 |
| 5,668,984 | 9/1997 | Taborn et al. | 395/563 |
| 5,732,007 | 3/1998 | Grushin et al. | 364/715.04 |
| 5,764,549 | 6/1998 | Bjorksten et al. | 364/715.04 |
| 5,771,183 | 6/1998 | Makineni | 394/715.04 |
| 5,867,407 | 2/1999 | Wolrich et al. | 364/715.04 |

OTHER PUBLICATIONS

Hokenek et al., "Leading–zero anticipator (LZA) in the IBM RISC System/600 floating–point execertion unit", IBM J. Res. Dev. vol. 34, No. 1, Jan. 1990, pp. 71–77.

Suzuki et al, "A 2.4–ns, 16–bit, 0.5–μm CMOS aarithmetic log unit for microprogrammable video signal processor LSIs",May 9, 1993, proceedings of the custom integrated circuits conference San Diego, pp. 12.04.01–12.04.04, IEEE.

Primary Examiner—Ayaz R. Sheikh
Assistant Examiner—Tim Vo
Attorney, Agent, or Firm—Marc A. Ehrlich

[57] ABSTRACT

Described is a floating point processor comprising a multiply section and an add section, for performing a multiplication-add operation comprised of a multiplication operation prior to an addition operation which is using the result of the multiplication operation. The floating point processor comprises a multiply add controller (MAC1) which receives signals representing the exponents of the operands for the multiplication-add operation and signals representing the leading zero digits of an un-normalized result of the multiplication operation. The floating point processor further comprises a pair of shift units, (AL1, BN1), one receiving the un-normalized result of the multiplication operation and the other the operand to be added thereto. The multiply add controller (MAC1) determines shift values (Block_Norm_Value, AL1_Align_Value) for shifting both the un-normalized result of the multiplication operation and the operand to be added thereto within the pair of shift units (AL1, BN1), so that both are aligned with respect to their corresponding digits and with respect to the data width of an adder (ADD-D) of the add section.

13 Claims, 6 Drawing Sheets

| CASE | CYCLE | REGISTER CONTENTS | | | |
|---|---|---|---|---|---|
| A | 1 | MA=41 333333 33333333 | MB=41 300000 00000000 | | |
|  | 2 | FA=50 111111 11111111 | Ps/PC= 000000 000000 000000 | MA * MB | ExpC=42   MNSA=0 |
|  | 3 | FC= 1111111 11111100 | 000000 0000000 | | MR=099999 99999999 900000 00000000 |
|  |  | FD= 0000000 00000000 | 000000 0000000 | | MLZD=1 |
|  | 4 | FE= 1111111 11111100 | 000000 0000000 | | |
|  | 5 | RESULT=50 111111 11111111 | | | RESULT=41 999999 99999999 |
| B | 1 | MA=41 222222 22222222 | MB=41 200000 00000000 | | |
|  | 2 | FA=43 111111 11111111 | Ps/PC= 111111 1111110 | MA * MB | ExpC=42   MNSA=0 |
|  | 3 | FC= 0000000 00000001 | 044444 4444444 | | MR=044444 44444444 400000 00000000 |
|  |  | FD= 0000000 00000001 | 155555 5555554 | | MLZD=1 |
|  | 4 | FE= 0000000 00000001 | 155555 5555554 | | |
|  | 5 | RESULT=43 115555 55555555 | | | RESULT=41 444444 44444444 |
| C | 1 | MA=42 444444 44444444 | MB=43 100000 00000000 | | |
|  | 2 | FA=42 111111 11111111 | Ps/PC= 110000 0000000 | MA * MB | ExpC=45   MNSA=0 |
|  | 3 | FC= 0000111 11111111 | 110000 0000000 | | MR=044444 44444444 400000 00000000 |
|  |  | FD= 0044444 44444444 | 400000 0000000 | | MLZD=1 |
|  | 4 | FE= 0044555 55555555 | 510000 0000000 | | |
|  | 5 | RESULT=44 445555 55555555 | | | RESULT=44 444444 44444444 |
| D | 1 | MA=49 000000 44444444 | MB=48 000000 00000000 | | |
|  | 2 | FA=41 111111 11111111 | Ps/PC= 110000 0000000 | MA * MB | ExpC=51   MNSA=18 |
|  | 3 | FC= 0001111 11111111 | 110000 0000000 | | MR=000000 00000000 000008 88888880 |
|  |  | FD= 0000000 88888000 | 000000 0000000 | | MLZD=1 |
|  | 4 | FE= 0001119 99999111 | 110000 0000000 | | |
|  | 5 | RESULT=41 111999 99999111 | | | RESULT=3E 888888 88000000 |

FIG. 8

BLOCK-NORMALIZATION IN MULTIPLY-ADD FLOATING POINT SEQUENCE WITHOUT WAIT CYCLES

FIELD OF THE INVENTION

The invention relates to an arrangement and a method in a pipeline floating-point processor (FLPT) for improving the performance of a multiply-add sequence.

PRIOR ART

Floating-point processors (FLPTS) are used to be functionally added to a main processor (CPU) for performing scientific applications. The multiply-add sequence consists of a multiply instruction followed by an add instruction. The multiplication is performed within three cycles: operand read, partial sums build, and add the partial sums to end result, and the addition also needs three cycles: operand read, operands alignment, and addition. All instructions are hardware-coded, so that no micro-instructions are needed.

In the entry-level models (e. g. 9221) of the IBM Enterprise System/9000 (ES/9000), (IBM, Enterprise System/9000 and ES/9000 are trademarks of International Business Machines Corporation), the floating-point processor is tightly coupled to the CPU and carries out all IBM System/390 (System/390 is a trademark of International Business Machines Corporation) floating-point instructions.

FIG. 1 shows the data flow of the above mentioned floating point processor which is described in more detail in the IBM Journal of Research and Development, Vol. 36, Number 4, July 1992. While the CPU is based on a four stage pipeline, the floating-point processor requires a five stage pipeline to perform its most used instructions, e. g. add, subtract, and multiply in one cycle for double-precision operands (reference should be made to "ESA/390 Architecture", IBM Form No. : G580-1017-00 for more detail).

In fast Floating Point Units a 'deep' pipelining is necessary. This has the disadvantage that in case of Source equal Target, that is when the successive instruction needs the result of the current instruction as input data, wait cycles will be necessary.

The CPU resolves operand addresses, provides operands from the cache, and handles all exceptions for the floating-point processor. The five stages of the pipeline are instruction fetch, which is executed on the CPU, register fetch, operand realignment, addition, and normalization and register store.

To preserve synchronization with the CPU, a floating-point wait signal is raised whenever a floating-point instruction needs more than one cycle. The CPU then waits until this wait signal disappears before it increments its program counter and starts the next sequential instruction, which is kept on the bus.

Because the IBM System/390 architecture requires that interrupts be precise, a wait condition is also invoked whenever an exception may occur. As can further be seen from FIG. 1, many bypass busses are used to avoid wait cycles when the results of the foregoing instructions are used. A wait cycle is needed only if the result of one instruction is used immediately by the next sequential instruction (NSI), e. g. when an add instruction follows a multiply instruction, the result of which has to be augmented by the addend of the add instruction.

The data flow shown in FIG. 1 has two parallel paths for fraction processing: one add-path where all non-multiply/divide instructions are implemented, and one multiply path specially designed for multiply and divide. The add-path has a fixed (60) bit width and consists of an operand switcher, an aligner, an adder, and a normalizer shifter. Instead of using two aligners on each side of the operand paths, a switcher is used to switch operands, thereby saving one aligner. The switcher is also needed for other instructions, and so, circuitry is reduced.

The multiplier path consists of a booth encoder for the 58-bit multiplier, a multiplier macro which forms the 58×60-bit product terms sum and carry, and a 92-bit adder which delivers the result product. The sign and exponent paths are adjusted to be consistent with the add path. The exponent path resolves all exception and true zero situations, as defined by the earlier cited IBM System/390 architecture.

The implementation of all other instructions is merged into the add path and multiply path, and requires only minimal additional logic circuits. The data flow in FIG. 1 therefore, shows more function blocks and multiplexer stages than needed for only add, subtract, and multiply operations.

As further can be seen from FIG. 1, the data flow is partitioned into smaller parts FA, FB, FC, FD, MA, MB, PS, PC, and PL (typically registers with their input control). These partitions and the partitioning of the floating-point instructions into three main groups are:

1.) addition/subtraction, load;
2.) multiplication; and
3.) division.

These are the instructions most used in scientific applications. The first two groups of instructions are performed in one cycle, and division is made as fast as possible.

For an add instruction, during the first two pipeline stages, only instruction and operand fetching are done. All data processing is concentrated in the third and fourth pipeline stages. In the fifth stage, the result is written back to a floating-point register.

Loading operations are treated like addition, with one operand equal to zero. During stage 3 the exponents of both operands are compared in order to determine the amount of alignment shift. The operand with the smaller exponent is then passed to the aligner for realignment. In stage 4 of the pipeline the aligned operands are added. The addition may produce a carry-out, which results in a shift right by one digit position, in accordance with the referenced architecture. The exponent is then decreased accordingly.

Multiplication is implemented by using a modified Booth algorithm multiplier with serial addition of partial product terms. It is used to be performed within three instruction cycles in most of the high performance mathematical co-processors:

1. Operand read,
2. Partial sums build and
3. Add partial sums to the end result. (Reference should be made to FIG. 2b)

Data bypass in the first and third cycles allows a saving of one cycle when using the same result for a following instruction. However, one wait cycle is still needed as can be seen from FIG. 3, where a multiply instruction is immediately followed by an add instruction which uses as addend or augment the result of the preceding multiplication.

In solving mathematical problems, especially in matrix calculations, the sequence multiply-add, where the add operation uses the result of the multiplication, is used very often.

RISC (reduced instruction set computer) systems, such as IBM's RS/6000, (RS/6000 is a trademark of International Business Machines Corporation), have a basic design which allows the combination of both operations in a single complex. However, this design does not conform with the system/390 architecture earlier cited. Old programs may deliver different results as from system/390 mode. To avoid this a single wait cycle has to be inserted (FIG. 3).

In performance calculations a LINPACK loop is often used, which consists of a sequence of five instructions:
1.) Load;
2.) Multiply;
3.) Add;
4.) Store; and
5.) Branch back.

The branch instruction is normally processed in zero-cycle so that the additional wait cycle would contribute to a performance degradation of 25%.

A fast multiply-add instruction sequence in a pipeline floating-point processor is known from the European Patent Application 93115706.9 by the same applicant. The data flow of the therein described pipeline floating-point processor is shown in FIG. 4 and allows a zero wait processing of the multiply-add instruction sequence, as can be seen from FIG. 5, which is obtained by essentially four modifications:

1. Data feedback of normalized data from the multiplier M into the aligners AL1 and AL2 via feedback path ND;
2. Shift left one digit by SL1 and SL2 on both sides of the data path for taking account of a possible leading zero digit of the product (special zeroing of guard digits);
3. Exponent generation by 9 bits for overflow and underflow recognition in Z1 and Z2. Due to underflow the exponent result is reset to zero on the fly by true zero; and
4. Both aligners AL1 and AL2 are expanded to 16 digits.

For performing the fast multiply-add instruction sequence in the European Patent Application 93115706.9, the following procedural steps are necessary (please refer to FIG. 5):

1. Read the operands OPDI and OPDII for performing a multiplication;
2. Calculate the intermediate exponent product and build the partial sums for multiplication in the multiply array M. At the same time read the operand OPD1 for the addition;
3. Add the partial sums of the multiply array to build the end product and feed the data back for the addition. In parallel a comparison of exponents is performed for an alignment in a 16-digit frame. An end alignment is then adjusted by one left shift if the leading digit of the product is zero. However, several cases have to be considered.
4. When both operands are properly aligned, they will be added to the final result of the multiply-add instruction sequence without any need for a wait cycle (as can be seen from a comparison of FIG. 3 and FIG. 5).

Concluding the multiply-add floating point sequences as known in the art, wait cycles are either accepted (with performance decrease) or a 'shortcut' in the dataflow is used to prevent wait cycles. However, in future hardware generations this solution will be no longer possible. The latency increases from two to three (one pipeline stage deeper). The cycle delay is shorter and therefore adder, normalizer and aligner can no longer be passed within one cycle.

SUMMARY OF THE INVENTION

It is an object of the invention to increase the performance of pipeline floating-point processors, mainly when matrix calculations have to be performed, with their high quantity of multiply-add sequences using the result of the immediately preceding multiplication.

The objects of the invention are solved by the independent claims.

A floating point processor according to the invention comprises a multiply section and an add section, for performing a multiplication-add operation comprised of a multiplication operation prior to an addition operation which is using the result of the multiplication operation. The floating point processor comprises a multiply add controller which receives signals representing the exponents of the operands for the multiplication-add operation and signals representing the leading zero digits of an un-normalized result of the multiplication operation. The floating point processor further comprises a pair of shift units, one receiving the un-normalized result of the multiplication operation and the other the operand to be added thereto.

The multiply add controller determines shift values for shifting both the un-normalized result of the multiplication operation and the operand to be added thereto within the pair of shift units, so that both are aligned with respect to their corresponding digits and with respect to the data width of an adder of the add section.

In the floating point processor of the present invention, the pair of shift units and the adder of the add section comprise at least the same-data width, double data width, than the un-normalized result of the multiplication operation. However, a further increase of the data width results in a further improvement of the processor, particularly with respect to processsing speed.

By applying the above features on a pipeline floating-point processor the advantage of a 25% performance increase for multiply-add instructions will be achieved. Furthermore, the multiply-add path has been reduced so that faster cycle can be applied.

The invention thus allows to execute the multiply-add sequences comprising a source equal target situation without any wait cycle.

In the multiply-add sequences according to the invention, no normalization of the multiply result is necessary before it is gated into the addition data path. A block-normalization, that means that data is shifted by a coarse shift amount, preferably by the normal data width to the left or right, or kept straight, is preferably carried out with the un-normalized (raw) result of the multiplication, whereas the operand to be added thereto is preferably only shifted with a fine shift amount. Thus, a much faster (block-) normalization than the normalization followed by an aligning as carried out in prior art circuits can be achieved.

A feed-back path from the multiplier to the main adder is provided. In one cycle, it is not possible to normalize and align the result of the multiplication before an addition with the result of that multipication in the main adder can be carried out. The result of the multiplication is therefore preferably block-normalized, the second operand (of the add instruction) is pre-aligned adequately, and preferably a double width main adder is used.

DESCRIPTION OF THE DRAWINGS

The invention will now be described by way of example and with reference to the accompanying drawings in which:

FIG. 8 shows four examples for different cases A, B, C and D.

GENERAL DESCRIPTION OF THE INVENTION

Figure 1:
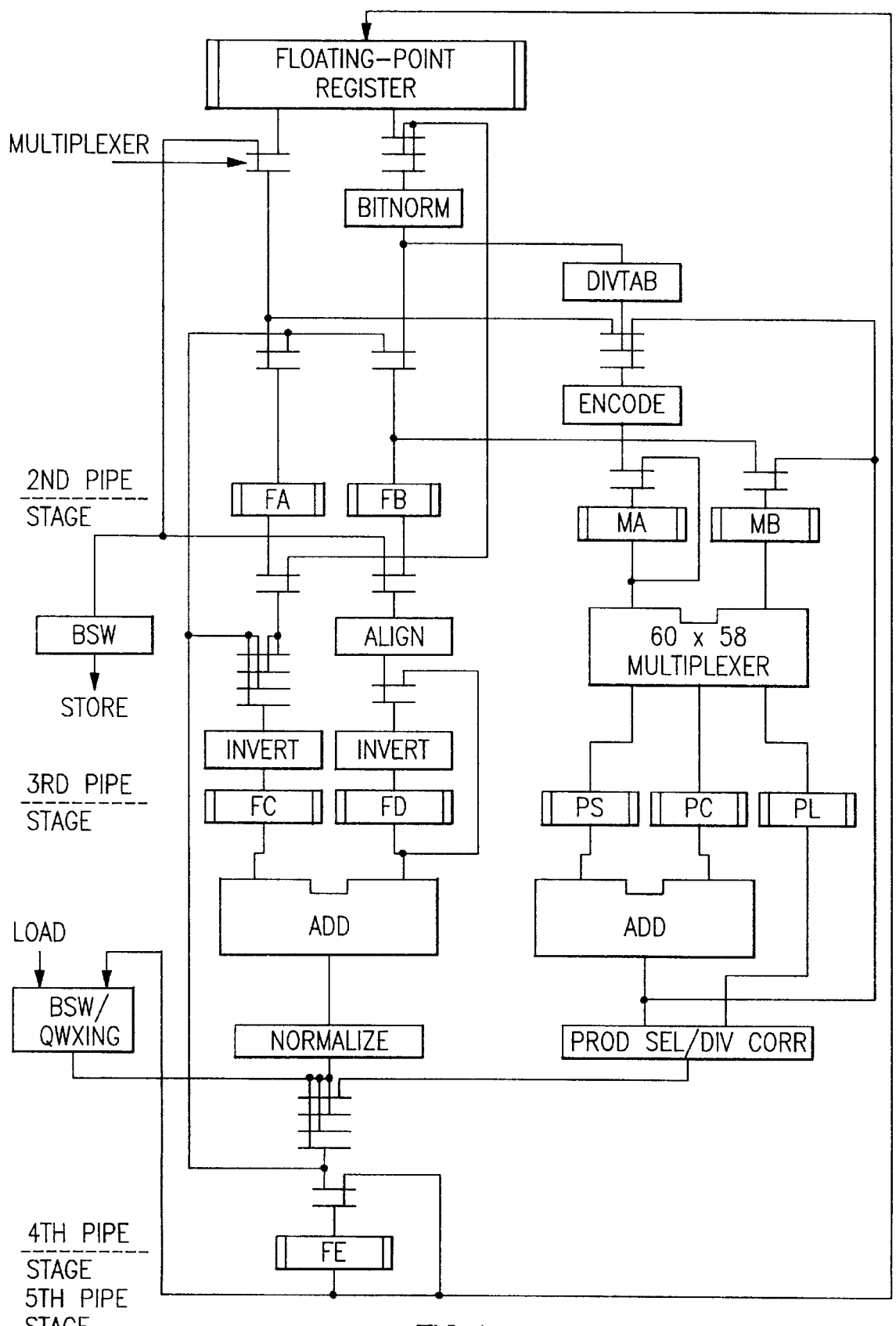
FIG. 1 illustrates a block diagram of a prior art pipeline floating-point processor.
Figure 2A:
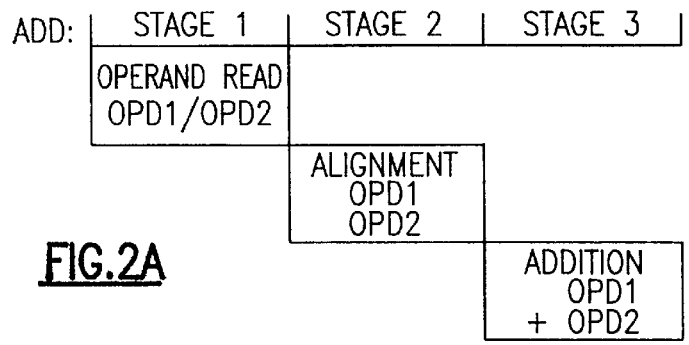
FIGS. 2a, 2b, 3 show a schematic representation of various stages of a pipeline handling an add instruction, a multiply instruction, and a multiply-add instruction sequence in a pipeline floating-point processor of FIG. 1.
Figure 2B:
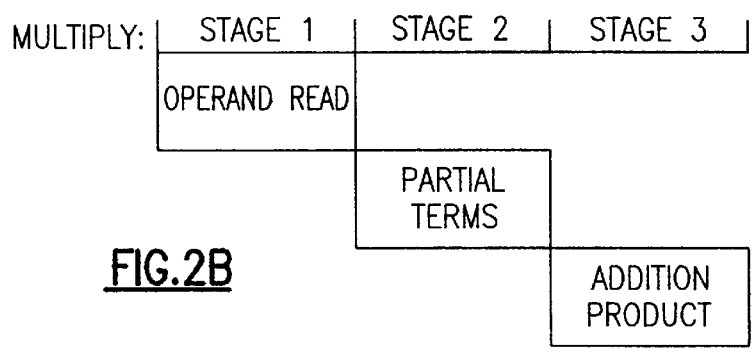
Figure 3:
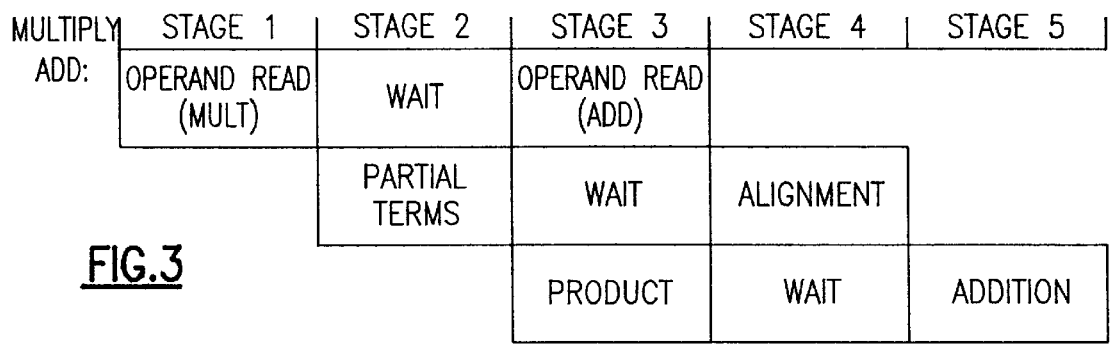
Figure 4:
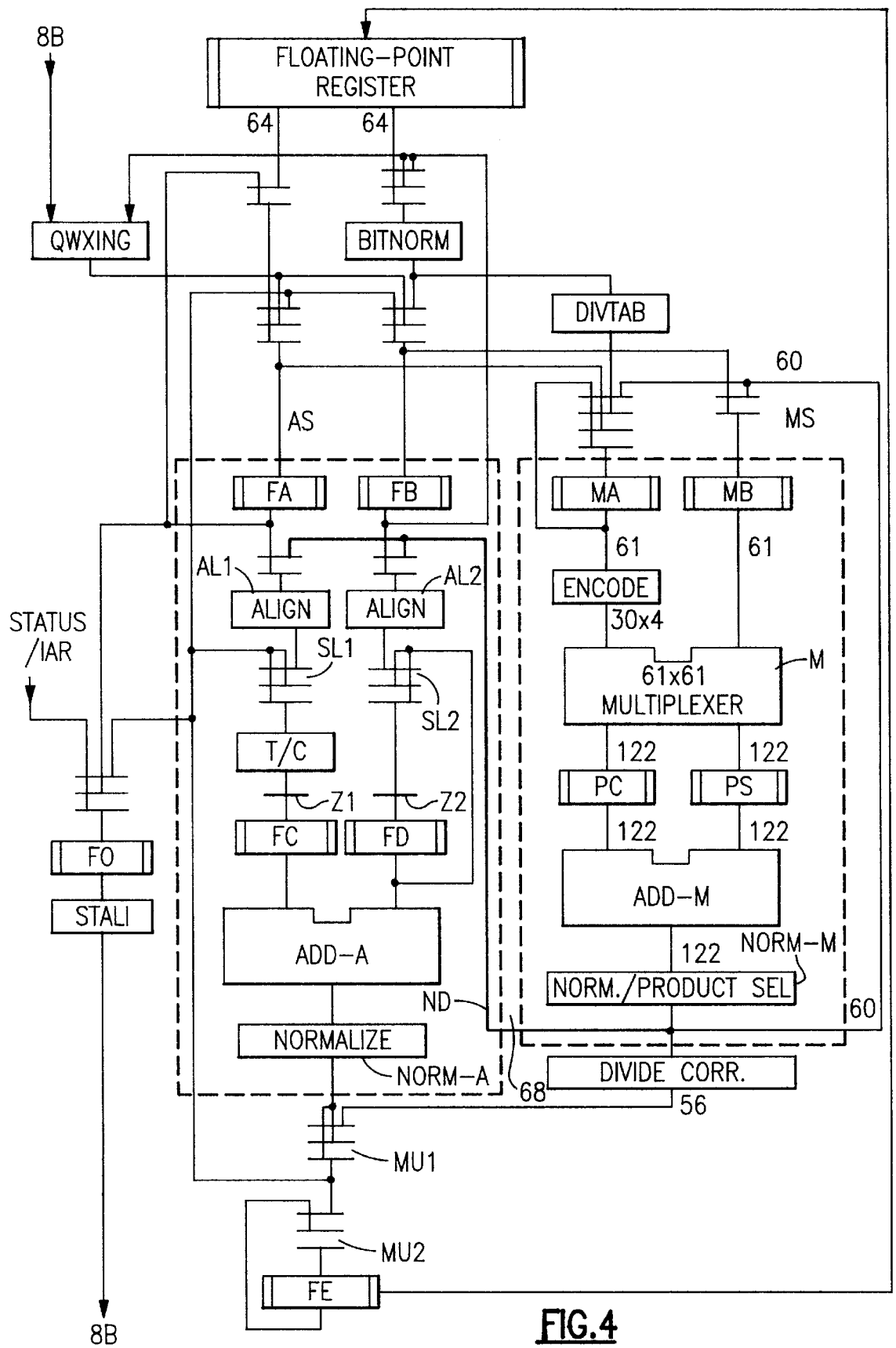
FIG. 4 illustrates a block diagram of a pipeline floating point processor according to the prior art.
Figure 6:
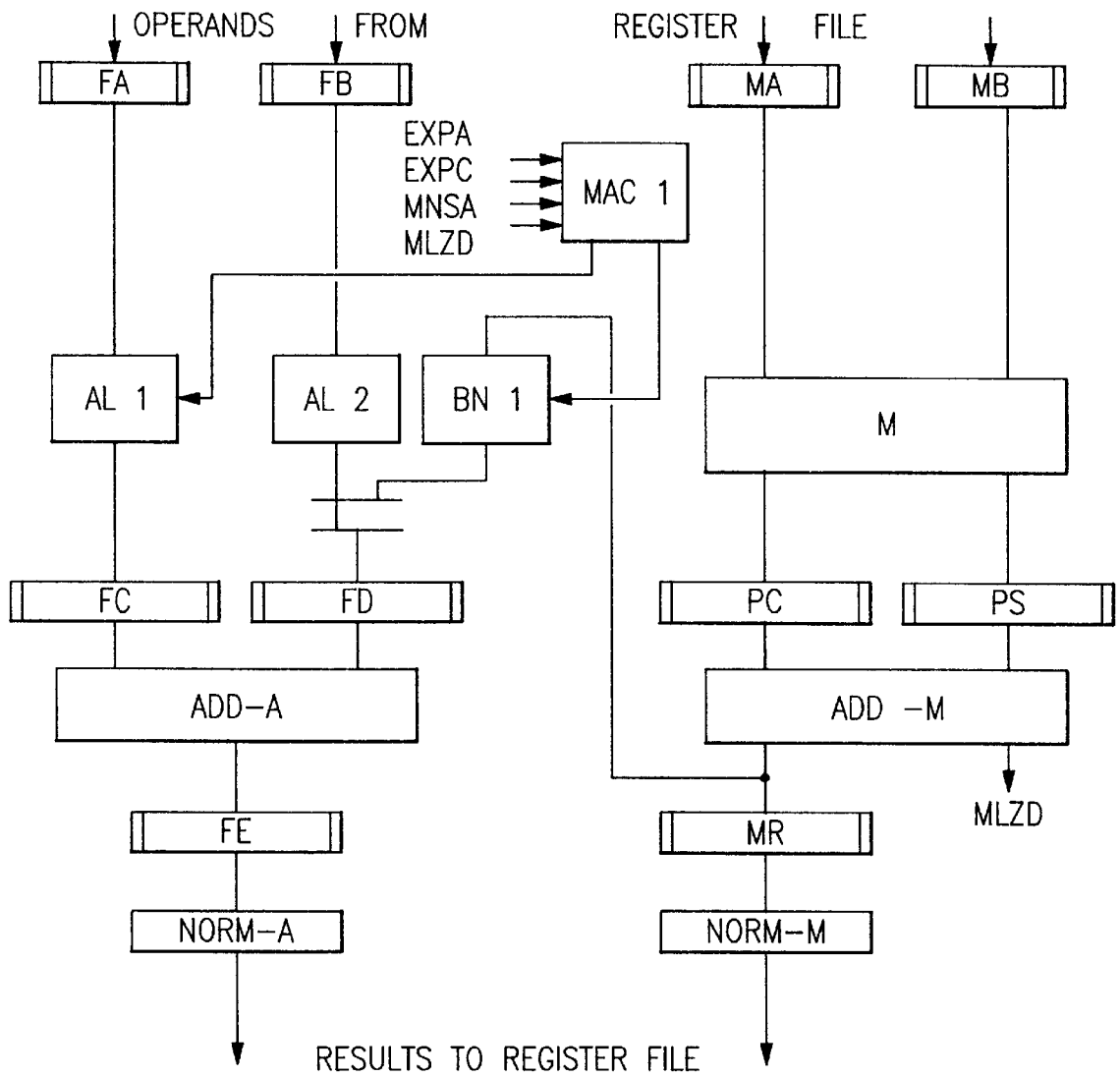
FIG. 6 shows a data flow of a pipeline floating-point processor according to the invention.

A data flow of a pipeline floating-point processor according to the invention is shown in FIG. 6. Functional units in FIG. 6 providing substantially the same function as functional units in FIG. 4 are referred to with the same reference signs. FIG. 6 only shows the necessary functional units and modifications with respect to the circuit in FIG. 4. However, it is to be understood that the circuit of FIG. 6 can be part of an multiply-add environment according to FIG. 1 or 4.

The object of the circuit in FIG. 6 is to execute first a multiply instruction with the operands OPDI and OPDII, and then execute a successive add instruction by adding an operand OPD1 to the result of the previous multiplication of the operands OPDI and OPDII. Such a multiply/add function comprises a source equal target situation, since the addition can first be carried out when the result of the multiplication has been determined.

The operands OPDI and OPDII are loaded into the registers MA and MB and the partial results of the multiplication are provided in the multiplier tree M and stored in the registers PC and PS. The multiplication adder ADD-M forms a raw result of the multiplication of the operands OPDI and OPDII which is then stored in the register MR and eventually normalized by the normalizer NORM-M. Normalizing means that the leading zero digits of a floating point number are removed. Raw result means that the result is still un-normalized, so that the raw result can contain a certain amount of leading zero digits. Furthermore, the raw result generally is of double width than the normalized data.

The multiplication adder ADD-M further issues a multiply leading zero digit signal MLZD which indicates whether the result of the multiplication shows an unpredictable leading zero digit or not. A multiplication of two operands with n digits, each without leading zero digits, can lead to a result with either 2n or 2n−1 digits. The MLZD signal indicates whether the result either shows 2n or 2n−1 digits, and that, in the latter case, the first digit of the result is a leading zero digit from the multiplication.

The raw result of the multiplication adder ADD-M is applied via a feed back path to a block-normalizer BN1. The block-normalizer BN1 receives a further signal from a multiply add controller MAC1 which receives the following inputs:

the exponent ExpA of the operand OPD1;

an exponent ExpC which is the sum of the exponents of the operands OPDI and OPDII;

a value MNSA as the sum of the leading zero digits of the operands OPDI and OPDII; and the multiply leading zero digit MLZD.

The multiply add controller MAC1 therefrom determines a value Block_Norm_Value for the block-normalizer BN1 and a value AL1_Align_Value for the aligner AL1. The multiply add controller MAC1 determines the digits, which have to be set to zero for both the aligner AL1 and the block-normalizator BN1. The details of the multiply add control block MAC1 depend upon the data width and the architecture of the floating point unit (see example).

The Block_Norm_Value indicates how the raw result from the multilication has to be adjusted with respect to its fraction and its exponent for the subsequent addition operation with the operand OPD1. Accordingly, the AL1_Align_Value indicates how the operand OPD1 has to be adjusted with respect to its fraction and its exponent for the subsequent addition operation with the raw result from the multiplication. Preferably, a pre-adjustment with a coarse adjustment is done by the block-normalizer BN1 and a fine adjustment by the aligner AL1 (see example as below).

The adjusted operand OPD1 and the adjusted raw result of the multiplication are stored in the registers FC and FD, respectively. Main adder ADD-A forms the sum of the adjusted operand OPD1 and the adjusted raw result of the multiplication and stores the result to register FE. The result of the addition is eventually normalized in a normalizer NORM-A.

It is clear that since the un-normalized raw result of the multiplication is used, which has a double width than the normalized data in such a processing unit, the aligner AL1, the registers FC, FD, and FE, the main adder ADD-A and the normalizer NORM-A need to be at least of double width as well. However, 'un-used' bits in the double width devices have to be set to 0's.

When the aligner AL1, the registers FC, FD, and FE, the main adder ADD-A and the normalizer NORM-A are used with a data width of four times of the normalized data width, the block-normalizer BN1 can be simplified and thus an improvement of the processing of the block-normalizer BN1 can be achieved.

The aligner AL2 is used for addition or subtraction instructions when no multiply/add function with a source equal target situation is required (called a 'normal' Add/Sub instructions). The aligner Al1 can be used for 'normal' Add/Sub instructions as well as for multiply/add operations with a source equal target collision. However, it is to be understood that when the operand to be added with the raw result is applied in the register FB, or in other words, when multiply/add operations with a source equal target collision are applied to the FC register as target, an equivalent circuit comprising a second block-normalizer BN2 with a feed back path from the multiplication adder ADD-M, and a second multiply add controller MAC2 then controlling the aligner AL2 and the second block-normalizer BN2. The aligner AL2 must also be of double width.

Figure 5:
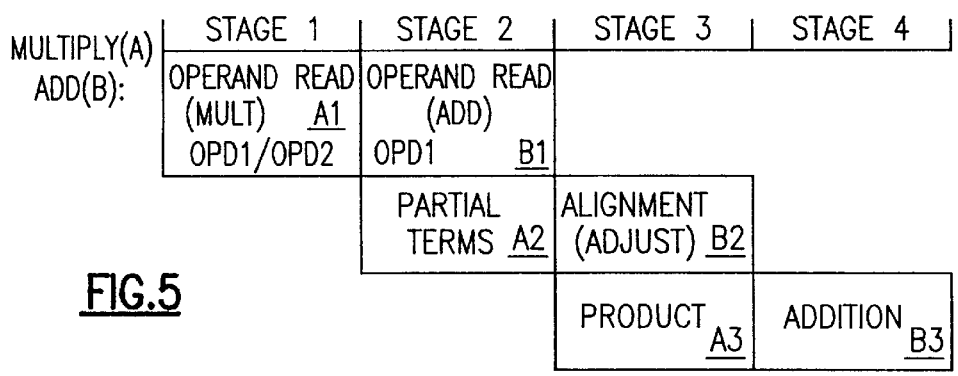
FIG. 5 shows a schematic representation of the pipeline stages of the floating-point processor of FIG. 4, handling a multiply-add instruction sequence.

The floating-point processor according to the invention thus allows a zero wait processing of the multiply-add instruction sequence, as can be seen from FIG. 5. summarizing the foregoing, the floating-point processor according to the invention differs from the prior art circuit of FIG. 4 by the following modifications:

1. The registers FC, FD, FE, the aligner AL1, the main adder ADD-A and the normalizer NORM-A have to be of the double width than the normalized data;
2. The multiply add control block MAC1 and the block normalizator BN1; and
3. The data feedback from the multiplier ADD-M to the block normalizator BN1.

DETAILED DESCRIPTION OF THE INVENTION

In the following example a pipelining of eight and a latency of three is assumed. A latency of three indicates that two wait cycles are necessary between two subsequent instructions with a source equal target situation. The floating point processor of the example generally calculates 16 hexadecimal digits, in total 64 bits; 2 digits (8 bits) are reserved for an exponent and 14 digits (56 bits) for a fraction. For internal calculations, a so called guard digit (4 bits) is used for calculations with the fraction, so that the data path for fraction operations must be minimum 15 digits (60 bits). A double width main adder ADD-A is used with 29 digits or 116 bits.

Only 60 bits of the 116 bit wide main adder of the example are actually used. The 'un-used' bits have to be set to 0's. The result must be exactly the same if the multiply/add sequence were executed in a un-interrupted sequence, or if the sequence is interrupted by any reason. The final normalization of the multiply result is transferred to the post-normalization in the normalizer NORM-A outside the main adder ADD-A. All standard adder functions like Subtraction, Carry In, Carry Out, Overflow, Underflow, Zero Detection, etc. are maintained.

Figure 7:
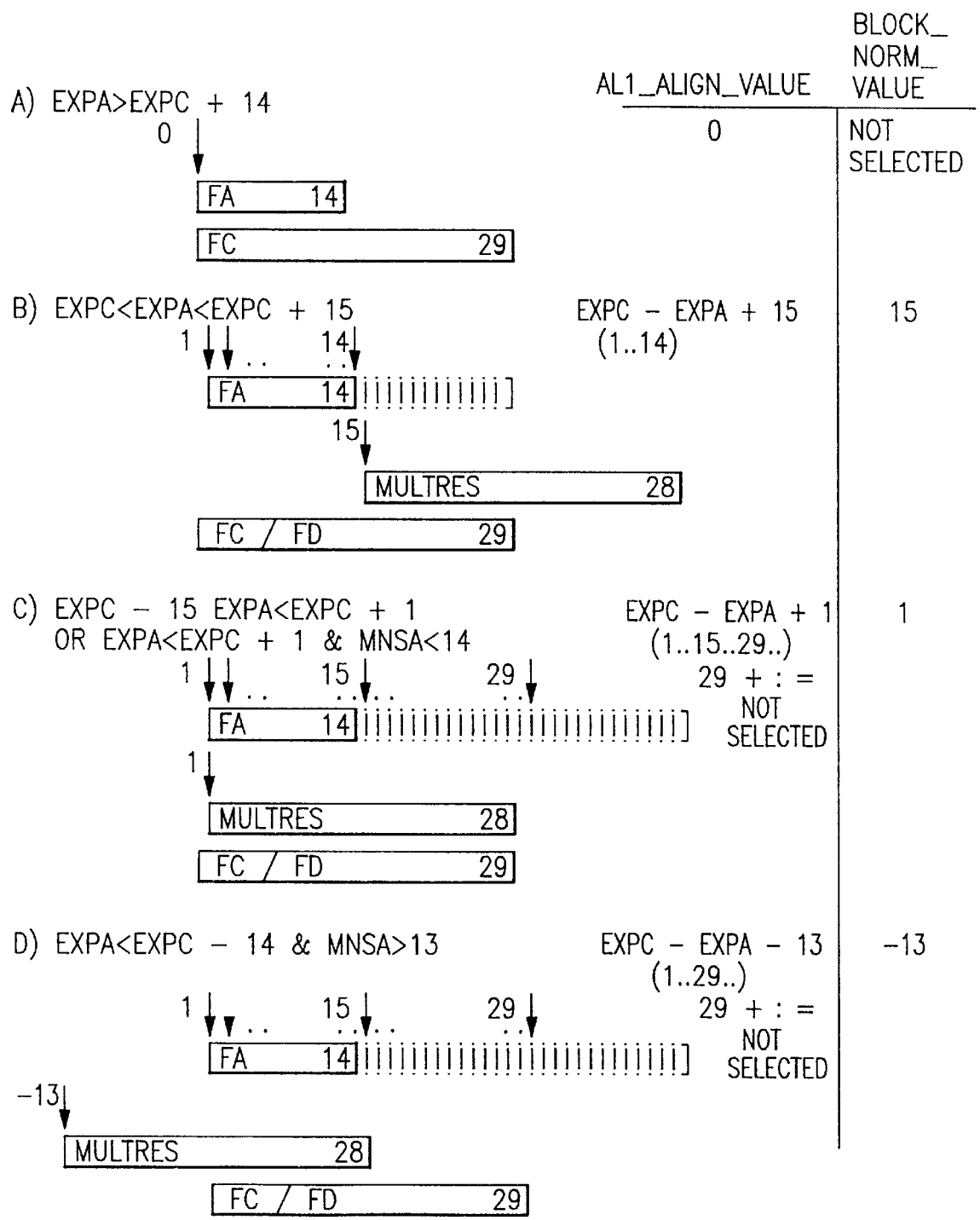
FIG. 7 shows the align values for a block-normalization with an IBM S/390, (S/390 is a trademark of International Business Machines Corporation) architecture and a data-width of 14 digits.

FIG. 7 shows the align values for a block-normalization with an IBM S/390 architecture and a data-width of 14 digits. The multiply-add controler MAC1 distinguishes between 4 cases (see also the 4 cases A–D in FIG. 8) of different situations depending upon the exponents of the operands and the leading zero digits of the raw result of the multiplication.

Depending on the signals MNSA and MLZD the un-used bits of the outputs of the block-normalizer BN1 and the aligner AL1 have to be set to zero. Register FA is aligned to FC and the raw result of the multiplication MultRes with 28 Digits is 'block-normalized' to FD. Block-normalized means that the raw result of the multiplication is shifted by the normal data width to the left or right, or kept straight. The align or normalize values indicate a respect value for shifting the digit either to the left or right. If the value is negative, a shift to the left is indicated. In the example an offset of 1 is used so that the block-normalization values are either 15, 1 or –13.

The aligner AL2 aligns 14 input digits to an output of 15 digits by an align value of 0 to 14 for standard calculations not supported by MAC1. AL2 is of standard data width (no double width as AL1). AL2 is not used in multiply-add sequences with source equal target.

The aligner Al1 is of double width and aligns 14 input digits to an output of 29 digits by an align value of 0 to 29 (Al1_Align_Value). Zero setting of unselected bits is also done.

The block normalizer BN1 aligns 28 input digits to 29 output digits by an normalize value of 1, 15 or –13. Zero setting of unselected bits is also done. The normalize value can have other values (i.e. 0, 14, –14) depending on the detailed realization. It is crucial that there are only a few, e.g. three as in the example, normalization values. This allows a fast hardware implementation.

The main adder ADD1 calculates the 29 digit sum of two 29 digit input operands from the registers FC and FD. The double width normalizer NORM-A normalizes 29 input digits to an 14 digit result. The normalizer NORM-M is the normalizer for the multiply results from the register MR and generates the final multiply result of 14 digits.

Four examples for different cases A, B, C and D can be seen in FIG. 8. All numbers represent hexadecimal digits according the IBM architecture.
Case A Exponent of OPD1 is greater than Exponent OPDI +Exponent OPDII+14

In Cycle 1, OPDI is registered in register MA and OPDII in MB. OPDI has an exponent of 41 and a fraction of 333333 33333333. OPDI therefore represents the value 0.333333 33333333 161. Accordingly, OPDII represents the value 0.300000 00000000 161.

In Cycle 2, the ExpC is built (42→162). Since there were no leading zero digits of OPDI and OPDII, the value for MNSA is zero. The operand OPD1 is now registered in the FA register and represents the value 0.111111 11111111 1616.

In Cycle 3, the raw result of the multiplication is available in register MR, and has a value of 0.099999 99999999 900000 00000000. The multiplication result shows a leading zero digit so that MLZD is '1'.

In case A, all bits of the FD register are set to zero by the MAC1 and BN1 blocks (the most significant digit of the multiplication result is less significant than the least significant digit of OPD1). The FC register contains the aligned value of the previous contents of the FA register (align value was 0). The content of FC is 0.111111 11111111 000000 00000000.

In cycle 4, the normalized result of the multiply intruction is available (output of NORM_M) as 0.999999 99999999 16**1. The FE register contains the unnormalized result of the multiply/add instruction sequence as 0.111111 11111111 000000 00000000.

In cycle 5, the normalized result of the multiply/add intruction sequence is available as the value 0.11111111111111 16**16.

The cases B, C and D can be read in the same way.

We claim:

1. A floating point processor comprising:
  a multiply section having,
  a first input register (MA) and a second input register (MB) for intermediately storing first and second operands (OPDI, OPDII),
  a multiplier (M) coupled to said first and second input registers (MA, MB) for performing a multiplication of said first and second operands (OPDI, OPDII),
  adder output registers (PC, PS) coupled to said multiplier (M) for intermediately storing partial sums of said multiplication,
  a first adder (ADD-M) coupled to said adder output registers (PC, PS) for performing an addition of said partial sums, and
  a first normalizer (NORM-M) connected to said first adder (ADD-M) for normalizing an output of said first adder (ADD-M);
  an add section having,
  a third input register (FA) and a fourth input register (FB) for intermediately storing said first and second operands (OPDI, OPDII),
  a first aligner (AL1) connected to said third input register (FA) for aligning said first operand (OPDI),
  a second aligner (AL2) connected to said fourth input register (FB) for aligning said second operand (OPDII),
  a first adder input register (FC) coupled to said first aligner (AL1) for intermediately storing an output of said first aligner (AL1),
  a second adder input register (FD) coupled to said second aligner (AL2) for intermediately storing an output of said second aligner (AL2),
  a second adder (ADD-A) coupled to said first and second adder input registers (FC, FD) for adding outputs of said first and second adder input registers (FC, FD), and a second normalizer (NORM-A) connected to said second adder (ADD-A) for normalizing an output of said second adder (ADD-A);

a third normalizer (BN1) connected to said first adder (ADD-M) and to said output of said second aligner (AL2) to adjust a feedback output of said first adder (ADD-M); and a multiply add controller (MAC1) receiving signals representing the exponents of said first and second operands (OPDI, OPDII) and signals representing the leading zero digits of said first and second operands (OPDI, OPDII), said multiply add controller (MAC1) is connected to said third normalizer (BN1) to provide a value (Block_Norm_Value) for adjusting said feedback output, said multiply add controller (MAC1) is connected to said first aligner (AL1) to provide a value (AL1_Align_Value) for adjusting said output of said first aligner (AL1).

2. The floating point processor of claim 1 wherein said signals representing the exponents of said first and second operands (OPDI, OPDII) comprise:

a signal representing the exponent of said first operand (OPDI); and a signal representing an exponent that is the sum of the exponents of said first and second operands (OPDI, OPDII).

3. The floating point processor of claim 1 wherein said signals representing the leading zero digits of said first and second operands (OPDI, OPDII) comprise:

a signal representing the sum of the leading zero digits of said first and second operands (OPDI, OPDII); and a signal representing the leading zero digits of said output of said first adder (ADD-M).

4. The floating point processor of claim 1 wherein said third normalizer (BN1) comprises a block-normalizer.

5. The floating point processor of claim 1 wherein said third normalizer (BN1) provides a course adjustment and said first aligner (AL1) provides a fine adjustment.

6. The floating point processor of claim 1 wherein said first aligner (AL1), said third normalizer (BN1) and said second adder (ADD-A) support double width data.

7. The floating point processor of claim 1 wherein said adjusting said sum of said first addition which has been fed back provides a course adjustment and said adjusting said first operand which has been aligned provides a fine adjustment.

8. The floating point processor of claim 4 wherein said block-normalizer adjust said feedback output by shifting data of said feedback output left, right or straight.

9. A method of floating point processing comprising:

a method of multiplying including, performing a multiplication of first and second operands, performing a first addition of partial sums of said multiplication, and normalizing a sum of said first addition;

a method of adding including, aligning said first operand, aligning said second operand, performing a second addition on said first and second operands which have been aligned, feeding back said sum of said first addition to said second operand which has been aligned, normalizing a sum of said second addition;

adjusting said sum of said first addition which has been fed back; and adjusting said first operand which has been aligned.

10. The method of claim 9 wherein said steps of adjusting comprise adjusting in response to at least one of the exponents of said first and second operands and the leading zero digits of said first and second operands.

11. The method of claim 10 wherein the leading zero digits of said first and second operands comprise:

the sum of the leading zero digits of said first and second operands; and the leading zero digits of said sum of said first addition.

12. The floating method of claim 9 wherein said adjusting said sum of said first addition which has been fed back comprises shifting data left, right or straight.

13. The method of claim 10 wherein the exponents of said first and second operands comprise:

the exponent of said first operand; and an exponent that is the sum of the exponents of said first and second operands.

* * * * *